United States Patent
Guo et al.

(10) Patent No.: US 11,354,150 B1
(45) Date of Patent: Jun. 7, 2022

(54) UTILIZING MAINTENANCE EVENT WINDOWS TO DETERMINE PLACEMENT OF INSTANCES

(71) Applicant: Amazon Technologies, Inc., Seattle, WA (US)

(72) Inventors: Wenjian Guo, Bellevue, WA (US); John Edsel Santos, Belleuve, WA (US); Alexey Gadalin, Kirkland, WA (US); Ankit Jain, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 309 days.

(21) Appl. No.: 16/781,931

(22) Filed: Feb. 4, 2020

(51) Int. Cl.
  *G06F 9/455* (2018.01)
  *G06F 9/48* (2006.01)
  *H04L 41/22* (2022.01)
  *H04L 67/10* (2022.01)

(52) U.S. Cl.
  CPC ........ *G06F 9/45558* (2013.01); *G06F 9/4881* (2013.01); *H04L 41/22* (2013.01); *H04L 67/10* (2013.01); *G06F 2009/45575* (2013.01); *G06F 2009/45595* (2013.01)

(58) Field of Classification Search
  None
  See application file for complete search history.

(56) References Cited

U.S. PATENT DOCUMENTS

| | | | | |
|---|---|---|---|---|
| 8,214,829 B2* | 7/2012 | Neogi | ................. | G06F 9/45558 718/1 |
| 8,397,242 B1* | 3/2013 | Conover | ................... | G06F 8/52 718/1 |
| 8,799,920 B2* | 8/2014 | Lubsey | ................. | G06F 9/5011 718/104 |
| 9,535,752 B2* | 1/2017 | Lubsey | ............... | G06F 9/45558 |
| 9,935,845 B2* | 4/2018 | Firment | ................. | H04L 41/14 |
| 10,778,750 B2* | 9/2020 | Ringdahl | ............ | G06F 9/45558 |
| 10,853,111 B1* | 12/2020 | Gupta | ................. | G06F 9/45558 |
| 10,999,147 B2* | 5/2021 | Celozzi | ............... | G06F 9/45558 |

OTHER PUBLICATIONS

Bobroff et al. "Dynamic Placement of Virtual Machines for Managing SLA Violations", 2007 IEEE, pp. 119-128.*
Bharathi et al. "Virtual Machine Placement Strategies in Cloud Computing", 2017 IEEE, pp. 1-7.*

* cited by examiner

*Primary Examiner* — Van H Nguyen
(74) *Attorney, Agent, or Firm* — Lee & Hayes, P.C.

(57) ABSTRACT

This disclosure describes techniques for flexible maintenance windows for performing maintenance for instances. Using techniques described herein, a user of a service provider network may specify configuration data that relates to maintenance events of instances. A "maintenance event" is any event that relates to deploying instances and/or at least temporarily losing use of an instance. For example, a maintenance event may cause an instance to be deployed, re-booted, re-started, or replaced. According to some configurations, customers may specify one or more maintenance event windows for when maintenance is to be performed, as well as customize notifications that are provided to the customer about scheduled maintenance events. For instance, customers may create a maintenance window that specifies to perform maintenance on Tuesdays, between 2 AM-3 AM, and that notifications are to include information specified by the customer (e.g., through one or more tags).

20 Claims, 11 Drawing Sheets

UTILIZING MAINTENANCE EVENT WINDOWS TO DETERMINE PLACEMENT OF INSTANCES

BACKGROUND

Today, a large number of companies utilize functionality provided by a service provider. For example, companies may utilize computing resources provided by the service provider to run different applications on their behalf. The computing resources provided by the service provider may include data processing resources, such as virtual machine ("VM") instances, data storage resources, networking resources, data communication resources, network services, as well as other types of computing resources. To help ensure these computing resources operating properly, the service provider performs maintenance to keep the fleet of servers healthy and provide better availability and security for the customers of the service provider. To maintain running servers and perform recovery of degraded servers, the service provider schedules maintenance on these servers. As a result, customers running their applications on these servers are notified weeks in advance about these upcoming maintenance events. They can either wait for the maintenance activity to occur or proactively take actions to complete the maintenance activity at a time of their choosing before the defined maintenance schedule. Customers may proactively take steps to help reduce the impact of maintenance, however, this action by the customers adds operational overhead.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
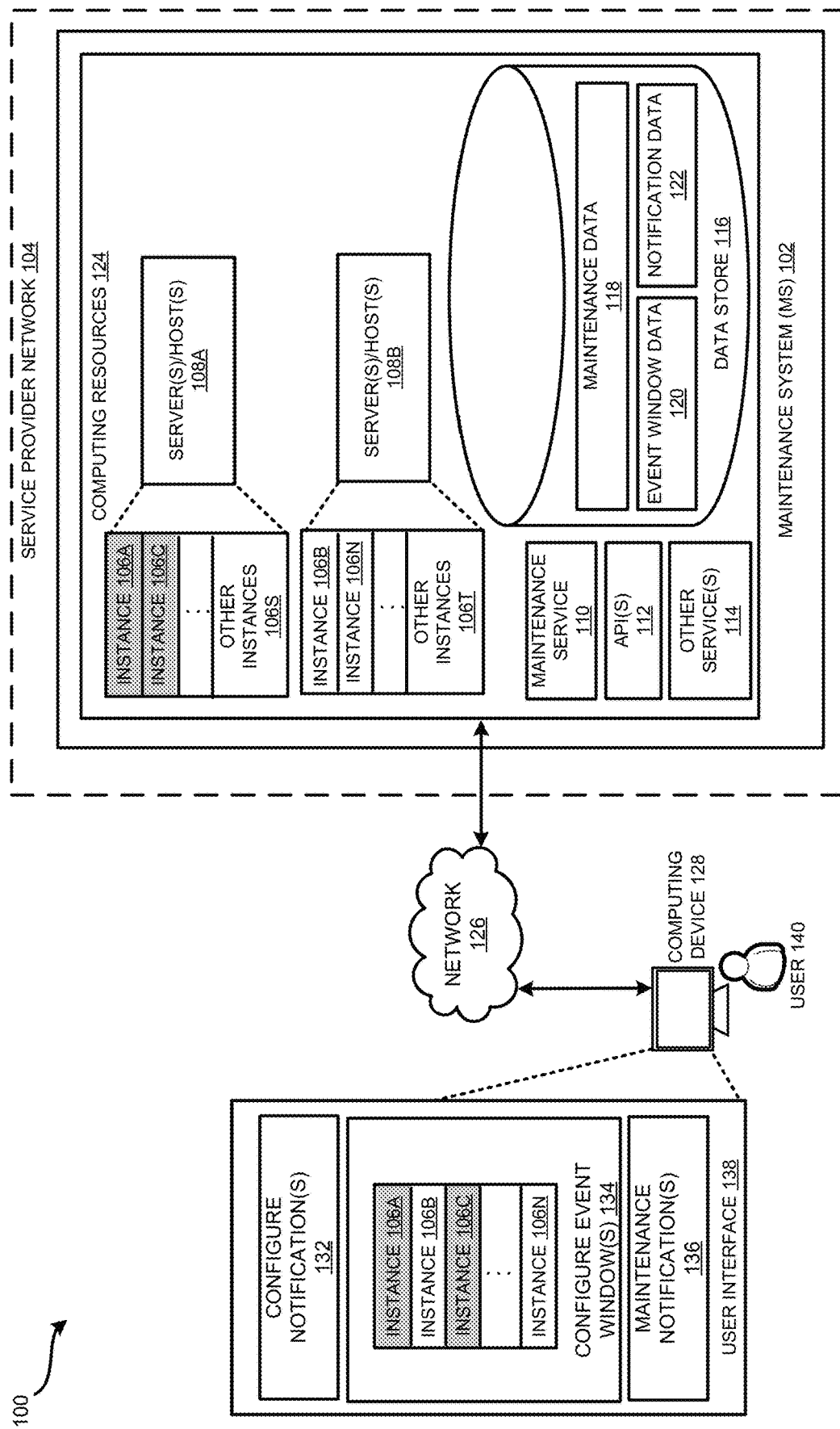
FIG. 1 is a software and network architecture diagram showing aspects of configuration and management of flexible maintenance windows and notifications for maintenance impacting instances.

This disclosure relates to techniques for utilizing maintenance event windows to determine placement of instances. Using techniques described herein, a user, such as a customer, of a service provider network may specify configuration data that relates to maintenance events of computing resources provided by a service provider network. As used herein, a "maintenance event" is any event that temporarily impacts a computing resource provided by the service provider network, such as Virtual Machine (VM) instance, for example for purposes of updating or replacing hardware or software of the host running the computing resource. For example, a maintenance event may cause an instance to be stopped, re-started, re-booted, or replaced, cause network connectivity and/or power to be lost for a period of time, and the like.

According to some configurations, customers may specify one or more maintenance event windows that specify when maintenance is allowed to be performed for one or more of their virtualized computing resources and can optionally customize notifications that are provided to the customer about scheduled maintenance events. For instance, a customer may create a maintenance window that specifies to perform maintenance on a first group of instances on Tuesdays, between 2 AM-5 AM, and specify that notifications about the maintenance on the first group of instances are to include information specified by the customer.

As used herein, a "maintenance event window" or an "event window" is a defined window that has a schedule (e.g., a start and/or end time), a duration, and identification of one or more computing resources (e.g., instances) that are to be acted upon or affected by a maintenance event. As briefly discussed, the maintenance event may impact the availability of instances that are currently running on one or more servers of the service provider network. Availability generally refers to a level of operational performance, such as "uptime," in which a computing system or workload is accessible. Once a maintenance event window is defined by the customer, the service provider (e.g., via a maintenance service provided by the service provider network) may utilize the maintenance event window to schedule maintenance events. For example, the maintenance service may configure maintenance to occur between the times specified by the event window. Beneficially, such maintenance windows can be useful for determining placement of instances to optimize fleet maintenance while minimizing disruptions to availability of customer workloads. For example, a control plane can determine to place instances on servers based on the times specified by the event window, such that instances having similar maintenance windows are co-placed on the same servers. This can allow the cloud provider to perform maintenance on the server such that it complies with the maintenance windows of all instances hosted by that server.

By allowing the customer of the service provider network to configure the timing of the maintenance events performed by the maintenance service, or by learning such windows based on historical customer behavior (e.g., a pattern of rescheduling maintenance events to within a certain window for a certain resource, or based on usage patterns for a certain resource), the maintenance can be scheduled during a time period that is least disruptive to availability of the resource. The maintenance event window also assists in avoiding performance issues, such as inaccessibility, latency, and the like to computing resources that the customer is trying to access. Further, the use of maintenance windows allows the service provider to maximize use of computing resources that host the instances impacted by the maintenance events. For instance, instead of causing a host to be brought offline more than one time, the service provider may schedule the maintenance events such that impact on the host servers are minimized.

According to some configurations, the service provider exposes different input mechanisms to configure the event windows and notifications (discussed below), such as a graphical user interface (GUI), a user interface (UI), a command line interface (CLI), an application programming interface (API), and the like. In some examples, the event maintenance service (MS) may expose event window settings that allow a customer to create/edit an event window. For instance, the customer may utilize the GUI to specify a name for the event window, a start time (e.g., day and time), an end time, and the computing resources (e.g., specified instances) to associate with the event window.

In some examples, the customer may also select the computing resources that are associated with the event window based on identifiers of the computing resources (e.g., the identifiers of instances), tags associated with the computing resources, geographic regions in which the computing resources are located, and the like. For example, a customer may create an event window named "Primary" that specifies that maintenance should occur on Saturdays from 4 AM-6 AM and associates the primary window with instances that support the customer's primary database. When the maintenance service determines that maintenance is to be performed on these instances, the maintenance service schedules maintenance on a Saturday between 4 AM and 6 AM as identified by the primary window.

In some configurations, a customer may create more than one event window. For example, a customer may create an event window for computing resources within a particular region, and an event window for a few number of instances. When deciding which event window to utilize, the MS may choose the event window based on various criteria. For instance, the MS may follow the order that utilizes the most specific event window to the least specific event window. As an example, when maintenance is to be scheduled, the MS first looks for an event window that is directly associated with that instance identifier, followed by an event window that is associated with tags that match the instance, followed by a window associated with a particular location/region in which the instance is located, and the like. If the MS is not able to identify an event window that is associated with a particular instance, then the MS may schedule maintenance on any day and provide a notification to the user (e.g., 2 weeks in advance before the scheduled maintenance time).

According to some configurations, the MS may determine to place computing resources, such as instances, of different customers on the same host based on the maintenance event windows defined by the different customers. In some instances, the MS may identify that a first customer has defined an event window that has times that overlap with an event window defined by a second customer. As an example, a first event window that is associated with a first customer may specify that maintenance is to occur for specified instances between Saturday at 8 AM and Saturday at 4 PM. A second event window that is associated with a second customer may specify that maintenance is to occur for specified instances between Saturday at 8 AM and Saturday at 12 PM. The MS may identify that an overlap of time exists between 8 AM and 12 PM and determine that instances from the first customer and the second customer are to be placed on one or more servers during the time that overlaps (e.g., from 8 AM-12 PM Saturday). In this way, the MS may minimize disruption not only to the customers that have specified the maintenance windows, but also to the servers hosting the instances.

In addition to configuring maintenance event windows, the customer may also configure notifications that are provided to the customer about maintenance events. In some examples, default notifications contain information such as the account identifier ((ID) of the instance, the region in which the instance is located, and an instance-ID of the instance that has an upcoming scheduled maintenance event. Utilizing techniques described herein, the customer may specify additional information that they would like to include with the notifications. According to some examples, the customer selects tags that they would like to include with the notification. For instance, the customer may specify to include information about the name, project, role, owner, service, and the like that are associated with the instance. By providing customization of the content included in the notifications, the customer may more easily identify which instances are affected by the maintenance events. For example, instead of the customer looking up the instance details in a UI, the customer may refer to the notifications. In some examples, the MS provides one notification per instance that is scheduled to undergo maintenance. The customer, however, may opt to group the notifications (e.g., into one notification). For example, the grouping option may be specified when creating/editing an event window. When the grouping option is specified, the MS provides one notification that identifies the instances that will undergo maintenance in that event window.

As discussed briefly above, the service provider may expose different input mechanisms to configure the notifications, such as a GUI, a UI, a CLI, an API, and the like to configure notifications. In some examples, the MS may expose notification settings within the UI and allow the customer to pick the tags for the instance that they would like to see in the notifications. After specifying the tags, maintenance notifications about upcoming include the tag and information associated with the tag, in addition to the existing account and instance details that are displayed in the default notification. The customer may utilize the input mechanism to modify these settings at any point. In some examples, when different regions of the service provider network are utilized by the customer, the customer may select an option to include the tags in maintenance notifications across different regions.

According to some examples, the MS exposes an API for the configuration and management of the maintenance windows and events. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The user may utilize the API and/or some other input mechanism to configure and manage the event windows and notifications.

Having the ability to configure event windows and notifications helps the customer manage maintenance events and reduce the impact that may be caused by maintenance. For instance, event windows allow a customer to have some control over the maintenance schedule for an application hosted by the service provider. Some customers may prefer maintenance to occur during off-peak hours, so the customer may create event windows for these hours. Since the service provider automatically schedules maintenance to occur during the event window, the customer does not have to worry about maintenance activity impacting the use of the application during peak-hours. Allowing for user-scheduled maintenance assists in preventing disruption to customers, resulting in reduced latency, avoiding the unavailability of resources while users are trying to use/access them. That is, by defining one or more event windows that schedule maintenance at a time when little to no users are accessing or using the computing resources, instances, and the like, being updated, the impact on the customer due to maintenance is reduced. The service provider also saves computing resources by reducing the time a server hosting instances is impacted.

Allowing a customer to specify the tags that they want to see in maintenance notifications allows the customer to escalate and take prompt actions if they see that some production instances are scheduled to be removed and/or replaced with other instances. Prior to the techniques described herein, the customer would have to login and manually search for and figure out which instance(s) and application(s) might be impacted by maintenance. Using the techniques described herein, however, the customer may receive that information via the notifications.

While the techniques described herein are with reference to flexible maintenance windows and notifications that for maintenance that impacts instances, the techniques are equally applicable to management of other computing resources. Additionally, while the examples herein discuss utilization of networks provided by a service provider, implementations are not so limited. For example, the techniques provided herein may be operating in other networks, across networks provide by different service providers, and the like.

Certain implementations and examples of the disclosure will now be described more fully below with reference to the accompanying figures, in which various aspects are shown. However, the various aspects may be implemented in many different forms and should not be construed as limited to the implementations set forth herein. The drawings herein are not drawn to scale. Like numerals represent like elements throughout the several figures (which might be referred to herein as a "FIG." or "FIGS.").

FIG. 1 is a software and network architecture diagram 100 showing aspects of configuration and management of flexible maintenance windows and notifications for maintenance impacting instances. It is to be appreciated that the environment 100 is merely illustrative and that the various configurations disclosed herein can be utilized in many different types of computing environments.

To provide functionality disclosed herein, the MS 102 may include one or more computing resources 124. The computing resources 124 may be provided by a service provider that operates one or more service/cloud provider networks 104 (sometimes referred to simply as a "cloud"), which refers to a large pool of network-accessible computing resources 124 (such as compute, storage, and networking resources, applications, and services), which may be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network, etc.) and the hardware and software in cloud provider data centers that provide those services.

A cloud provider network can be formed as a number of different regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster (or other event) should not take more than one availability zone offline at the same time. Users can connect to availability zones of the cloud provider network via a publicly accessible network (e.g., the Internet, a cellular communication network) by way of a transit center (TC). TCs are the primary backbone locations linking users to the cloud provider network and may be collocated at other network provider facilities (e.g., Internet service providers, telecommunications providers) and securely connected (e.g. via a VPN or direct connection) to the availability zones. Each region can operate two or more TCs for redundancy. The cloud provider network may deliver content from points of presence outside of, but networked with, these regions by way of edge locations and regional edge cache servers.

The cloud provider network 104 can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their users or clients. The computing resources 124 implemented by the MS 102 and executed on behalf of one or more users of the service provider can be data processing resources, such as virtual machine ("VM") instances, such as instances 106A-106N, data storage resources, networking resources, data communication resources, network services, and other types of resources.

The computing resources 124 utilized can be general-purpose or can be available in a number of specific configurations. For example, data processing resources can be available as physical computers or VM instances in a number of different configurations. The VM instances 106 can be configured to execute applications, including web servers, servers, media servers, database servers, some or all of the network services described above, and/or other types of programs. Data storage resources can include file storage devices, block storage devices, and the like. The MS 102 can also include and utilize other types of computing resources not mentioned specifically herein.

According to some configurations, servers, such as server(s)/host(s) 108, are utilized to provide at least a portion of the computing resources 124 and execute software components to provide functionality described herein, including functionality related to the configuration of event windows and notifications and notifications and the scheduling of maintenance events. The software components can execute on a single server or in parallel across multiple servers in the MS 102. In addition, a software component can consist of subcomponents executing on different servers or other computing devices in the MS 102. Various components can be implemented as software, hardware, or any combination of the two. In this regard, it is to be appreciated that the MS 102 shown in FIG. 1 has been simplified for discussion purposes and that many additional software and hardware components can be utilized.

A user 140 of the MS 102 can utilize a computing device 128, or some other input device, to access the MS 102 through a network 126. The user 140 may be a user of the service provider network 104 that provides computing resources 124 within the service provider network 104. The computing device 128 is an input/output device configured to receive input associated with specifying parameters utilized by the maintenance service 110 to configure event windows and notifications and managing maintenance events. The computing device 128 may also present for display a user interface 138, that may be utilized by the user 140 to configure notification(s) 132, configure event window(s) 134, view notification(s) 136, and the like. The user interface 138 may also be utilized by the user to interact with the MS 102.

The computing device 128 may be one or more devices, such as but not limited to a smart phone, a smart watch, a personal computer ("PC"), desktop workstation, laptop computer, tablet computer, notebook computer, personal digital assistants ("PDA"), electronic-book reader, game console, set-top box, consumer electronics device, server computer, or any other type of computing device capable of connecting to the network 126 and communicating with the MS 102.

As illustrated, the computing device 128 may couple with the MS 102 over a network 126. The network 126 may represent an array or wired networks, wireless networks (e.g., WiFi), or combinations thereof. The MS 102 may provide a variety of different services (not shown) as a network-accessible platform that is implemented as a computing infrastructure of processors, storage, software, data access, and so forth that is maintained and accessible via the network 126, such as the Internet. These services may not require end-user knowledge of the physical location and configuration of the system that delivers the services. Common expressions associated with these remote services, include "on-demand computing", "software as a service (SaaS)", "platform computing", "network accessible platform", and so forth.

The network 126 can be a local-area network ("LAN"), a wide-area network ("WAN"), the Internet, or any other networking topology known in the art that connects the user devices to the MS 102. The user 140 can use an application (not shown) executing on computing device 128 to access and utilize the functionality provided by MS 102. In some examples, the application is a web browser application. Generally, a web browser application exchanges data with the computing devices in the MS 102 using the hypertext transfer protocol ("HTTP") over the network 126.

The application might also be a stand-alone client application configured for communicating with the MS 102. The client application can also utilize any number of communication methods known in the art to communicate with the MS 102 across the network 126, including remote procedure calls, SOAP-based web services, remote file access, proprietary client-server architectures, and the like. According to some configurations, the application provides a user interface 138 that can be utilized by the user 140 for the configuration of the event windows and notifications. The user interface 138 may also be utilized to present data, and/or to interact with the MS 102.

In some examples, web service users or, in general, clients may utilize or otherwise control a processing entity of the service provider to control, access, or otherwise manage other computing resources. As such, data associated with the processing entity and/or the computing resources of the service provider may be transmitted to or received from computing resources of a client's private network (or other local network) via one or more network connections. As used herein, a processing entity may be a computing resource of the service provider and may include one or more computing devices, such as instantiated virtual machine instances, configured to access data of the distributed computing system (e.g., provided by the distributed computing system and acting on behalf of a client or user of the system).

In some configurations, the service provider may also provide storage, access, and/or placement of one or more computing resources 124 through a service such as, but not limited to, a web service, a cloud computing service, or other network-based data management service. For example, a user or processing entity acting on behalf of the user may access, via the service provider, data storage services and/or data management services such that access mechanisms may be implemented and/or provided by the service provider to the processing entity utilizing the computing resources 124. In some examples, computing resource services, such as those provided by the service provider, may include one or more computing resources accessible across one or more networks through user interfaces (UIs), application programming interfaces (APIs), and/or other interfaces where the one or more computing resources may be scalable and/or expandable as desired As briefly discussed above, a user of a service provider network, and/or a component or device, may utilize the MS 102 to configure maintenance windows and notifications. According to some configurations, the MS 102 exposes different input mechanisms to interact with the maintenance service 110, such as a user interface (UI) 138, a command line interface (CLI), API(s) 112, and the like. In some examples, the MS 102 may generate and display a GUI, such as within UI 138 (e.g., See FIGS. 3A, 3B, and 3C).

As a particular example, assume that user 140 has utilized UI 138 to configure one or more event window(s) 134 that are associated with one or more of the instances 106A-106N. Using the UI 138, the user 140 may specify a window of time in which to perform maintenance on instances 106 that are associated with an event window. For instance, the user 140 may utilize a GUI 138 to configure event window(s) 134 that is associated with instances 106A and 106C (as indicated by the shading in the configure event window(s) 134 of FIG. 1) and specifies a window of time in which to perform the maintenance. Similarly, another event window may be configured that specifies a different period of time and associates instance 106B and instance 106N. As briefly discussed, an event window allows a user 138 to specify a schedule for when to perform potentially disruptive actions on instances 106 such as patching an operating system, updating drivers, installing software or patches, re-starting/replacing server(s)/host(s) 108, and the like.

As also discussed above, the event windows may be used by the MS 102 to determine what server to place instances 106. For example, when new instances are being deployed, the MS 102 may utilize the times specified by the event window to assist in determining what server(s)/host(s) 108 to place the associated instances 106. In the example illustrated in FIG. 1, the MS 102 may determine to place instance 106A and 106C on server(s)/host(s) 108A, along with possibly other instances 106S that may be from the same customer or a different customer, such that subsequent maintenance events that impact instance 106A, 106B, and other instances 106S occur during a time that is specified by the customer(s) and minimizes disruption not only to the customer(s) that have specified the maintenance windows, but also to the servers hosting the instances 106. Similarly, the MS 102 may determine to place instance 106B and 106N on server(s)/host(s) 108B, along with possibly other instances 106T that may be from the same customer or a different customer.

According to some configurations, the event window data 120 that defines an event window may follow the JavaScript Object Notation (JSON) format. As an example, an event window specify various properties of an event window, such as start time that identifies a starting time at which maintenance for the associated instance(s) may be performed, a duration of the maintenance window and/or an end time, a name of the event window, a time zone associated with the event window, optional metadata (e.g., tags) that allow a user 140 to assign to a resource in the form of an arbitrary set of tags, and the computing resources (e.g., one or more of instances 106) with the event window. In some examples, the maintenance service 110 may receive the event window data 120 via UI 138, CLI, API(s) 112, and/or some other input mechanism.

The maintenance service 110 utilizes the event window data 120 to configure maintenance to occur between the times associated with the defined event windows And/or to determine the placement of instances on server(s)/host(s) 108. For example, the maintenance service 110 may determine that a maintenance event is to be scheduled that impacts instances 106A and 106C that are associated with a particular event window. When determining the maintenance data 118 that identifies when to perform the scheduled maintenance, the maintenance service 110 may determine that maintenance on instances 106A,106C, and other instances 106S is to be performed at a particular time within the time window specified by the window associated with instances 106A and 106C and one or more other event window(s) associated with the other instances 106S. By allowing the customer of the service provider network to configure the timing of the maintenance events performed by the maintenance service, the customer is able to align the maintenance events of the service provider with the customer's maintenance periods or business cycles, thereby helping the customer save time and effort. The service provider also is able to reduce the impact on server(s)/host(s) 108 since maintenance for the instances 106 hosted by server(s)/host(s) 108 is performed at the same or similar time.

As briefly discussed above, a user 140 may create more than one event window. When deciding which event window to utilize, the maintenance service 110 of the MS 102 may choose the event window based on various criteria. For instance, the maintenance service 110 may follow the order that utilizes the most specific event window to the least specific event window. If the maintenance service 110 is not able to identify an event window that is associated with a particular instance using the event window data 120, then the maintenance service 110 may schedule maintenance on any day and provide a notification(s) 136 to the user 140 (e.g., 2 weeks in advance before the scheduled maintenance time). As discussed in more detail below (See FIG. 2 and related discussion), the MS 102 may determine the placement of instances that are impacted by maintenance events such that disruption to server(s)/host(s) 108 is minimized.

In addition to configuring event windows, the user 140 may also configure notification(s) 132 that are provided to the user 140 about maintenance events for the instances. In some examples, default notifications contain information such as the account identifier ((ID), region and instance-ID of the instance that has an upcoming maintenance event. Utilizing techniques described herein, the customer may specify via the UI 138, the API(s) 112, or some other input mechanism additional information to include with and/or in place of the information associated with a default notification. According to some examples, the user 140 selects tags (See FIG. 3C) that they would like to include with the notification. For instance, the user 140 may specify to include information about the name, project, role, owner, service, and the like that are associated with the instance. By providing customization of the content included in the notifications, the user 140 may more easily identify which instances are affected by the maintenance events. For example, instead of the customer looking up the instance details in a UI, the customer may refer to the notification(s) 136.

After configuring the notification(s) 132, maintenance notifications provided by the maintenance service 110 about upcoming events may then include the tag and information associated with the tag, in addition to the existing account and instance details that are displayed in the notification. In some examples, the notification(s) provided by the maintenance service 110 include one notification per instance that is scheduled to undergo maintenance. The user 140, however, may opt to group the notifications (e.g., into one or more notifications). For example, the grouping option may be specified when creating/editing an event window. When the grouping option is specified by the user 140 via the UI 138, the API(s) 112, or some other input mechanism, the maintenance service 110 provides one notification that identifies the instances that will undergo maintenance in that event window. Additional details regarding the various components and processes described briefly above for configuring event windows and notifications and the scheduling of maintenance events will be provided below with regard to FIGS. 2-8.

Figure 2:
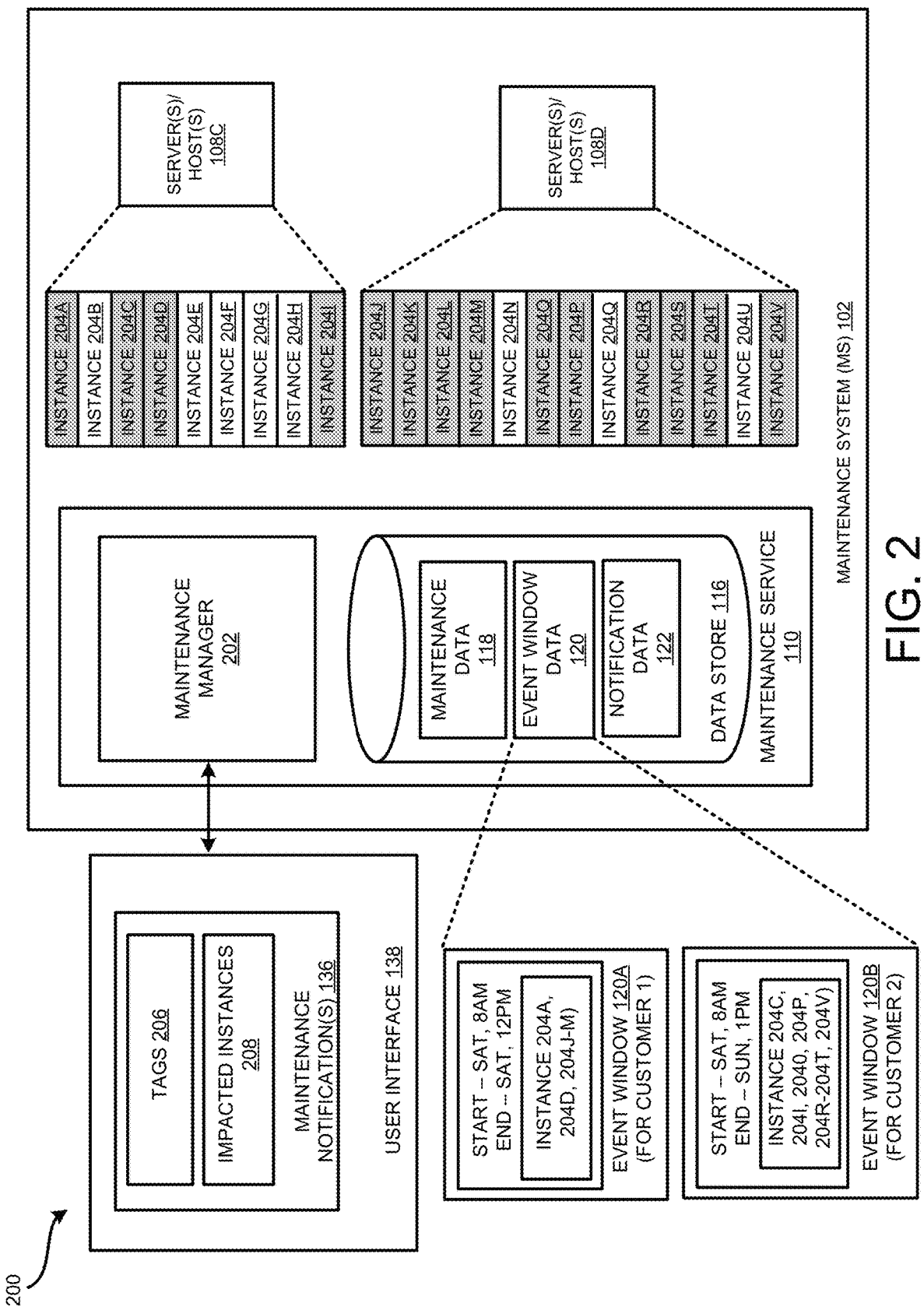
FIG. 2 is a software and network architecture diagram showing aspects of a configuration and management of flexible maintenance windows and notifications.

FIG. 2 is a software and network architecture diagram showing aspects of a maintenance system (MS) 102. It is to be appreciated that the environment 200 is merely illustrative and that the various configurations disclosed herein can be utilized in many different types of computing environments. FIG. 2 is similar to FIG. 1 but provides more details regarding scheduling the maintenance events and providing notifications.

As illustrated, the maintenance system 102 includes maintenance service 110, maintenance manager 202, server(s)/host(s) 108C, server(s)/host(s) 108D, data store 116, user interface 138, and instances 204A-204V. The maintenance manager 202 is configured to perform operations relating to scheduling maintenance events and providing notifications. In the current example, the maintenance service 110 is scheduling to perform maintenance on the instances 204A-204I associated with server(s)/host(s) 108C, and instances 204J-204V associated with server(s)/host(s) 108D.

As discussed above, when scheduling maintenance for computing resources, such as instances, the maintenance service 110 may access event window data 120 that identifies event windows that are associated with one or more users 140 of the service provider network. In the current example, the maintenance manager 202 has identified a first event window 120A that is associated with a first customer, and a second event window 120B that is associated with a second customer. The first event window 120A specified by the first customer specifies that instances 204A, 204D, and 204J-M are to undergo maintenance between Saturday at 8 AM to Saturday at 12 PM. The second event window 120b specified by the second customer specifies that instances 204C, 204I, 204O, 204P, 204R-T, and 204V are to undergo maintenance between Saturday at 8 AM to Sunday at 1 PM. Assume that the maintenance data 118 indicates that maintenance for instances 204A-204M is to occur between Friday at 3 AM to Sunday at 1 PM.

In some examples, when determining when to perform maintenance events for computing resources, such as the instances 204A-204M, the maintenance manager 202 may attempt to perform maintenance events at the same time (or near the same time) for different customers. For instance, in the current example, the maintenance manager 202 may determine that since instances 204A, 204C, 204D, and 204I are hosted by the same server(s)/host(s) 108C that maintenance events for these instances are to be scheduled at the same time in order to minimize disruption.

Maintenance manager 202 identifies that the times of event window 120A and event window 120B overlap (e.g., at least a portion of each time period of event window 120A and event window 120B is the same time period) between Saturday at 8 AM to Saturday at 12 PM. As such, the maintenance manager 202 schedules the maintenance for instances 204A, 204C, 204D, and 204I hosted by server(s)/host(s) 108C and instances 204J-204M, 204O, 204P, 204R-T, and 204V hosted by server(s)/host(s) 108D to be performed within the overlapping time period. For instance, the maintenance manager 202 may schedule a maintenance event for server(s)/host(s) 108C that impact instances 204A, 204C, 204D, and 204I on Saturday at 8 AM, and a maintenance event for server(s)/host(s) 108D that impact instances 204J-204M, 204O, 204P, 204R-T, and 204V on Saturday at 9 AM. In other examples, the maintenance manager 202 may determine that instances 204 of different customers may be placed onto one or more servers based on the instances 204 being associated with event windows 120 that overlap in time. For instance, the maintenance manager 202 may determine to place instances 204A, 204D, and 204J-M from customer 1 and instances 204C, 204I, 204O, 204P, 204R-T, and 204V on the same server(s)/host(s) 108.

Upon determining a schedule for the maintenance events, the maintenance manager 202 may store the maintenance data 118 in the data store 116 and generate the notification(s) 136. For example, the maintenance manager 202 may send a first notification 136 to user interface 138 identifying the impacted instances 208 (e.g., the instances 204A, 204C, 204D, and 204I), the tags specified by the user 140, and the indication that maintenance event is to occur on Saturday at 8 AM. Similarly, the maintenance manager 202 may send a second notification 136 to user interface 138 identifying the impacted instances 208 (e.g., the instances 204J-204M, 204O, 204P, 204R-T, and 204V), the tags specified by the user 140, and the indication that maintenance event is to occur on Saturday at 9 AM. Different notification(s) may be sent to the first customer and the second customer based on the configuration of the notification data 122 by each customer.

Figure 3A:
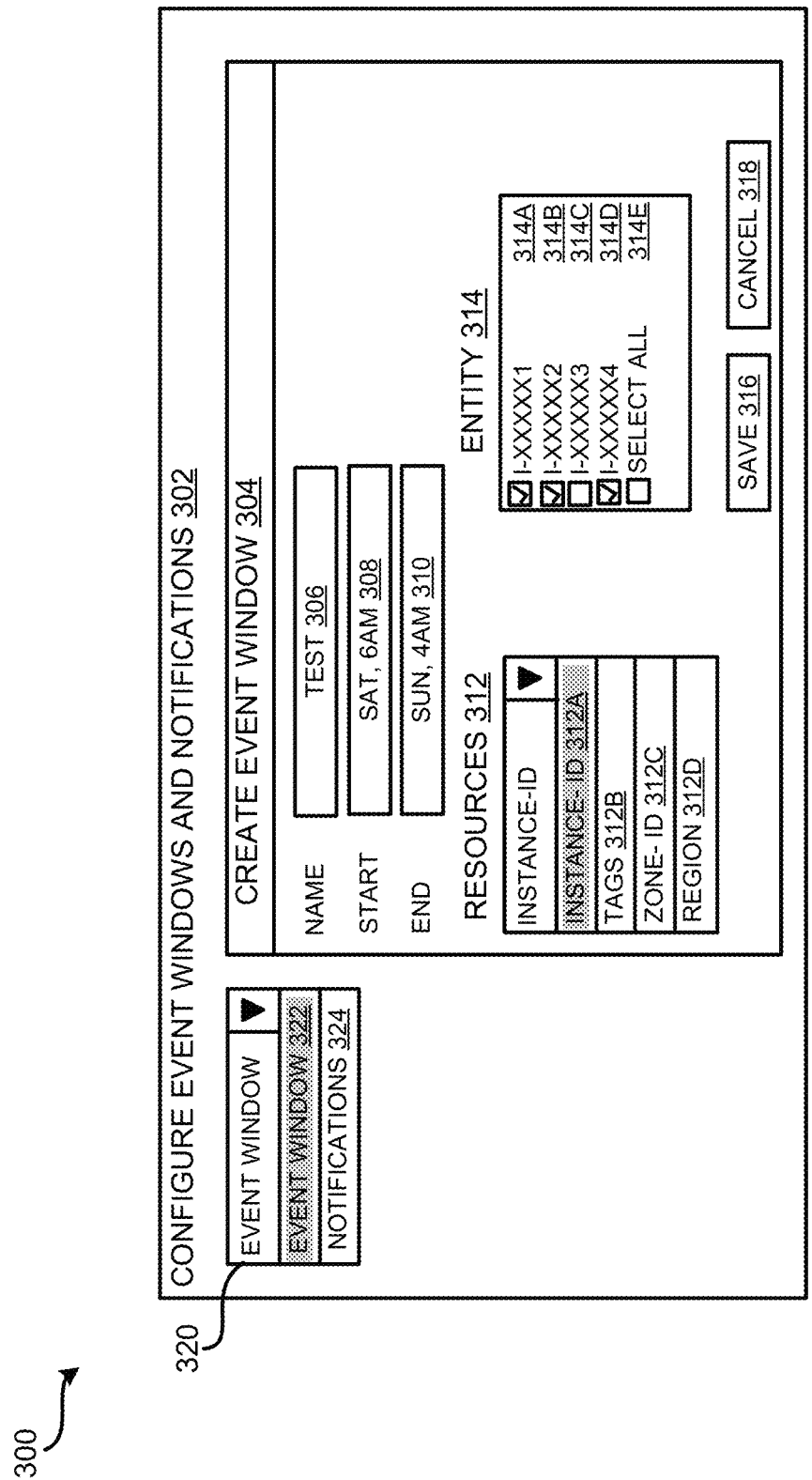
FIG. 3A is a diagram showing an exemplary graphical user interface for configuring and managing an event window.
Figure 3B:
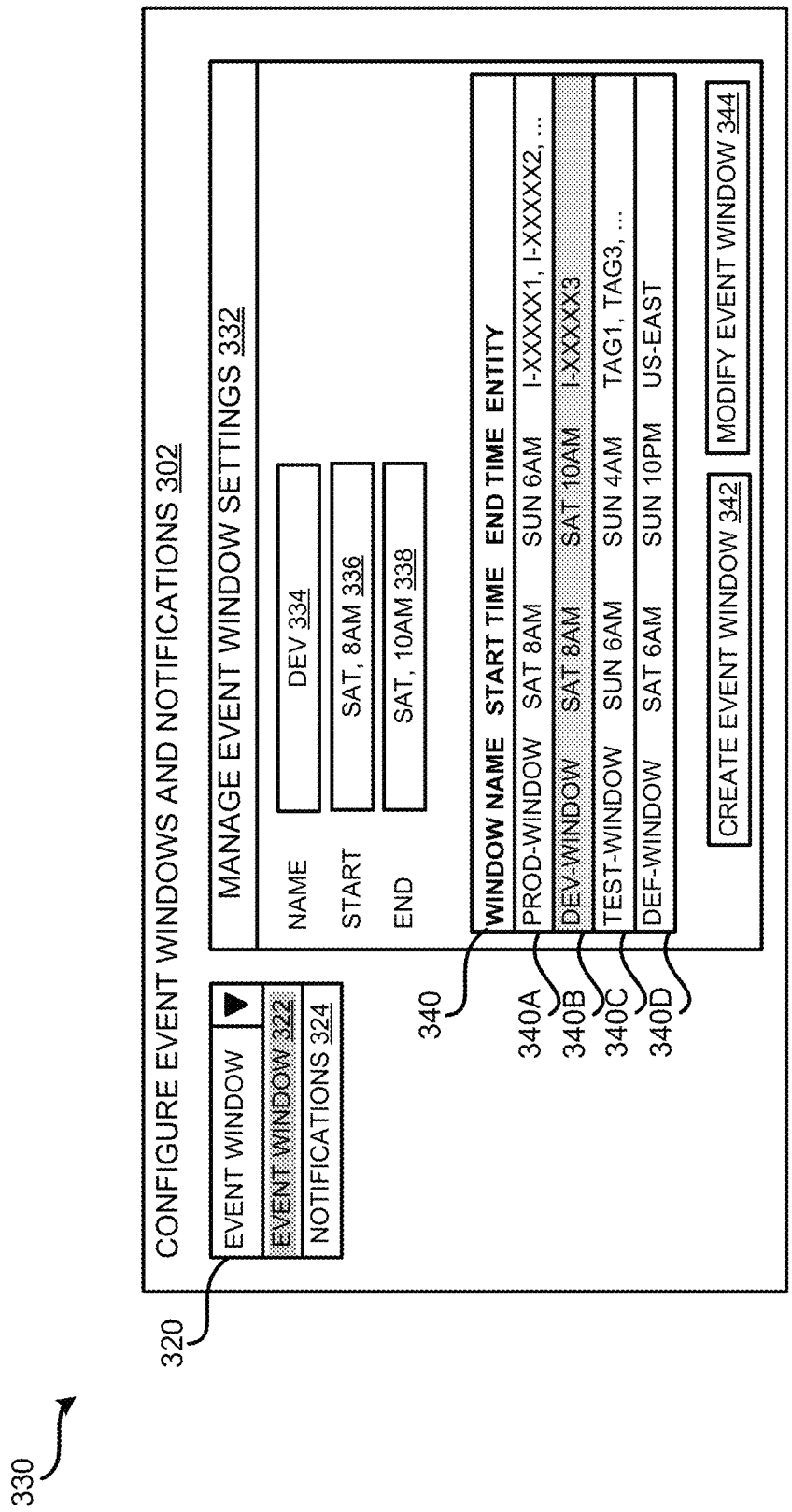
FIG. 3B is a diagram showing an exemplary graphical user interface for managing different event window settings.
Figure 3C:
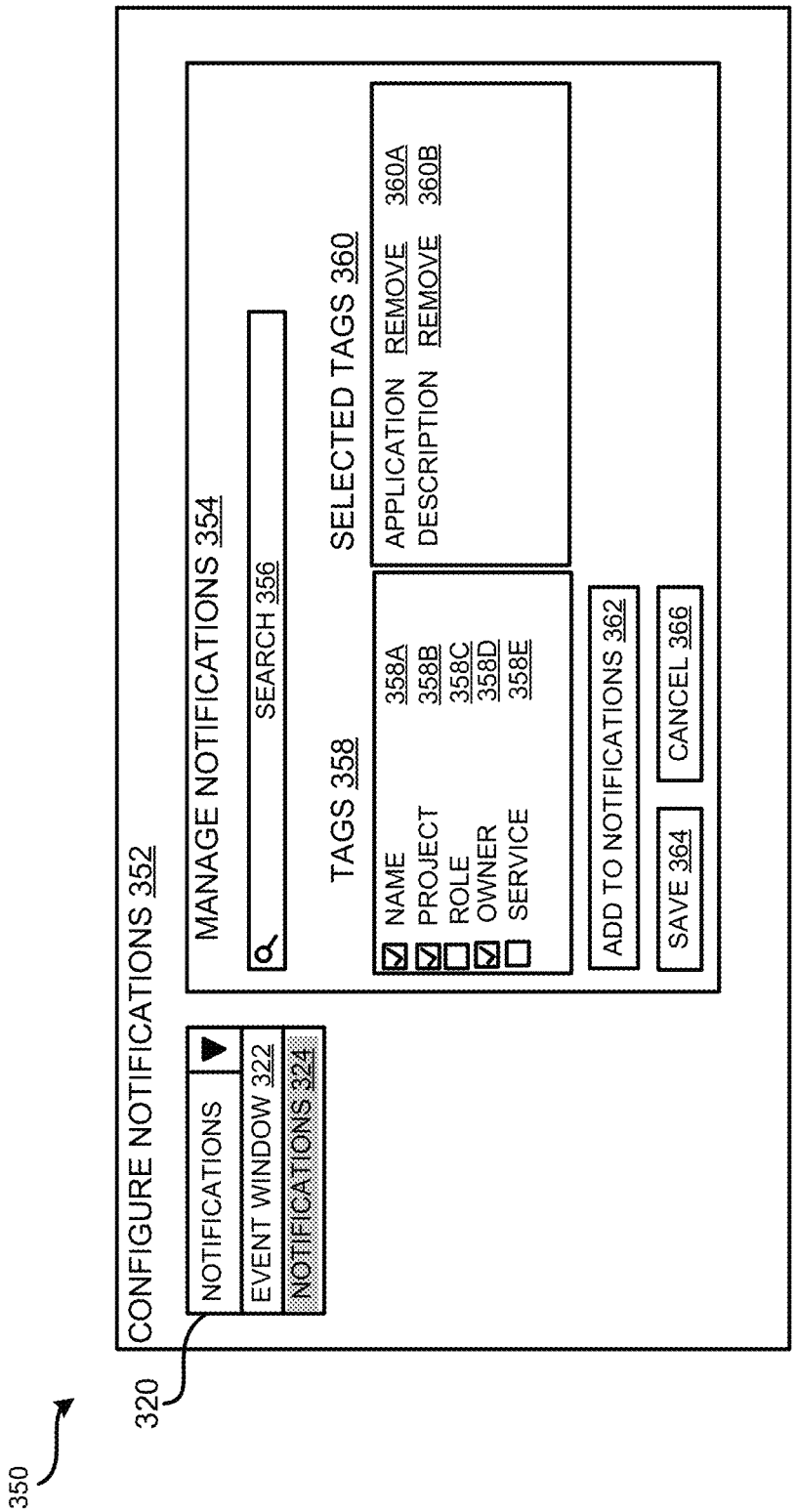
FIG. 3C is a diagram showing an exemplary graphical user interface for configuring notifications for maintenance events.

FIGS. 3A-3C are diagrams showing exemplary graphical user interfaces for configuring event windows and notifications. In some examples, the user 140 configures the event windows and notifications using a graphical user interface (GUI). In other examples, the user 140 may use a command line interface, or utilize an Application Programming Interface (API). In some instances, the MS 102 may provide data for displaying a GUI to a display associated with the user computing device 128.

In the example illustrated in FIG. 3A, GUI 300 shows user interface (UI) elements for selecting to configure event windows and notifications 324 and creating an event window. More or fewer UI elements may be included within GUI 300. As illustrated, the GUI 300 shows a configure event windows and notification window 302 that includes a selection UI element 320 that allows a user 140 to select an event window UI element 322 to configure an event window and a notifications UI element 324 to configure notifications for maintenance events. In the example illustrated, the user 140 has selected the event window UI element 322 as indicated by the shading. GUI 300 also shows a create event window 304 that may be displayed in response to the selection of the event window UI element 322.

Create event window 304 includes a name UI element 306, a start UI element 308, an end UI element 310, a resources selection UI element 312, an entity UI element 314, a save UI element 316, and a cancel UI element 318. In the current example, the user 140 has entered "Test" in the name UI element 306 and has specified a start time of the Test event window to be Saturday, at 6 AM within the start UI element 308, and an ending time of Sunday, at 4 AM within the end UI element 310. Other time formats may be utilized.

The resources UI element 312 is utilized by the user 140 to associate computing resources with the Test event window. In the current example, the user 140 has selected to associate particular instance identifiers with the Test event window by selecting instance ID option 312A within the resources UI element 312. In other examples, the user 140 may have selected the tags 312B option to associate instances having a particular tag(s) with the Test event window, the zone-ID 312C option to associate instances within a particular zone with the Test event window, and the region option 312D to associate instances within a particular region with the Test event window.

Upon selection of an option within the resources UI element 312, the entity UI element 314 displays available instances to associate with the test event window. In the current example, the user 140 has selected the instances I-XXXXX1, I-XXXXX2, and I-XXXXX2 as illustrated by the checkmarks in the selection elements 314A, 314B, and 314D. The user 140 may utilize the save UI element 316 to save the configuration of the test window, and the cancel UI element 318 to cancel any changes.

FIG. 3B shows GUI 330 that includes user interface (UI) elements for managing different event windows. More or fewer UI elements may be included within GUI 330. As illustrated, the GUI 330 includes a configure event windows and notification window 302 that includes a selection UI element 320 that allows a user 140 to select an event window UI element 322 to configure an event window and a notifications UI element 324 to configure notifications for maintenance events. In the example illustrated, the user 140 has selected the event window UI element 322 as indicated by the shading. GUI 330 also shows a manage event window settings window 332 that may be displayed in response to the selection of the event window UI element 322.

Manage event window settings window 332 includes a name UI element 334, a start UI element 336, an end UI element 338, a window UI selection element 340, a create event window UI element 342, and a modify event window UI element 344. In the current example, the user 140 has selected the dev event window as indicated by selection of window UI element 340B as indicated by the shading. Upon selecting the dev-window, the name UI element 334, the start UI element 336, and the end UI element 310 are filled with the values of the selected event window. If the user 140 would like to modify the event window, the user 140 may select the modify event window UI element 344 which may display a GUI, such as GUI 300 illustrated in FIG. 3A. If the user 140 would like to create a new event window, the user 140 may select the create event window UI element 342.

FIG. 3C shows GUI 350 that includes user interface (UI) elements for configuring notifications for maintenance events. More or fewer UI elements may be included within GUI 350. As illustrated, the GUI 350 includes a configure notifications window 352 that includes a selection UI element 320 that allows a user 140 to select an event window UI element 322 to configure an event window and a notifications UI element 324 to configure notifications for maintenance events The manage notifications window 354 includes a search UI element 356, a tags UI element 359, a selected tags UI element 360, an add to notifications UI element 363, a save UI element 364, and a cancel UI element 366. The search UI element 356 may be utilized by the user 140 to search for a computing resources (e.g., instances), and/or other information associated with the management and configuration of the event windows and notifications.

The tags UI element 358 allows the user 140 to select additional information that is to be included within a notification relating to one or more computing resources. In the current examples, the user 140 has selected to include the name of the computing resource, a project associated with the computing resource, and the owner of the computing resource as indicated by the check boxes next to UI element 358A, 358B, and 358D. In some configurations, the user 140 may add additional tags to be included in the notifications (not shown). The selected tags UI element 360 indicates the currently selected tags to include within the notifications for the resources.

In the example illustrated, the user 140 has selected the notifications UI element 324 as indicated by the shading. GUI 350 also shows a manage notifications window 354 that may be displayed in response to the selection of the notifications UI element 323. The user 140 may utilize the add to notifications UI element 362 to add the selected tags in the tags UI element 358, the save UI element 364 to save the configuration of the notifications, and the cancel UI element 366 to cancel any changes.

Figure 4:
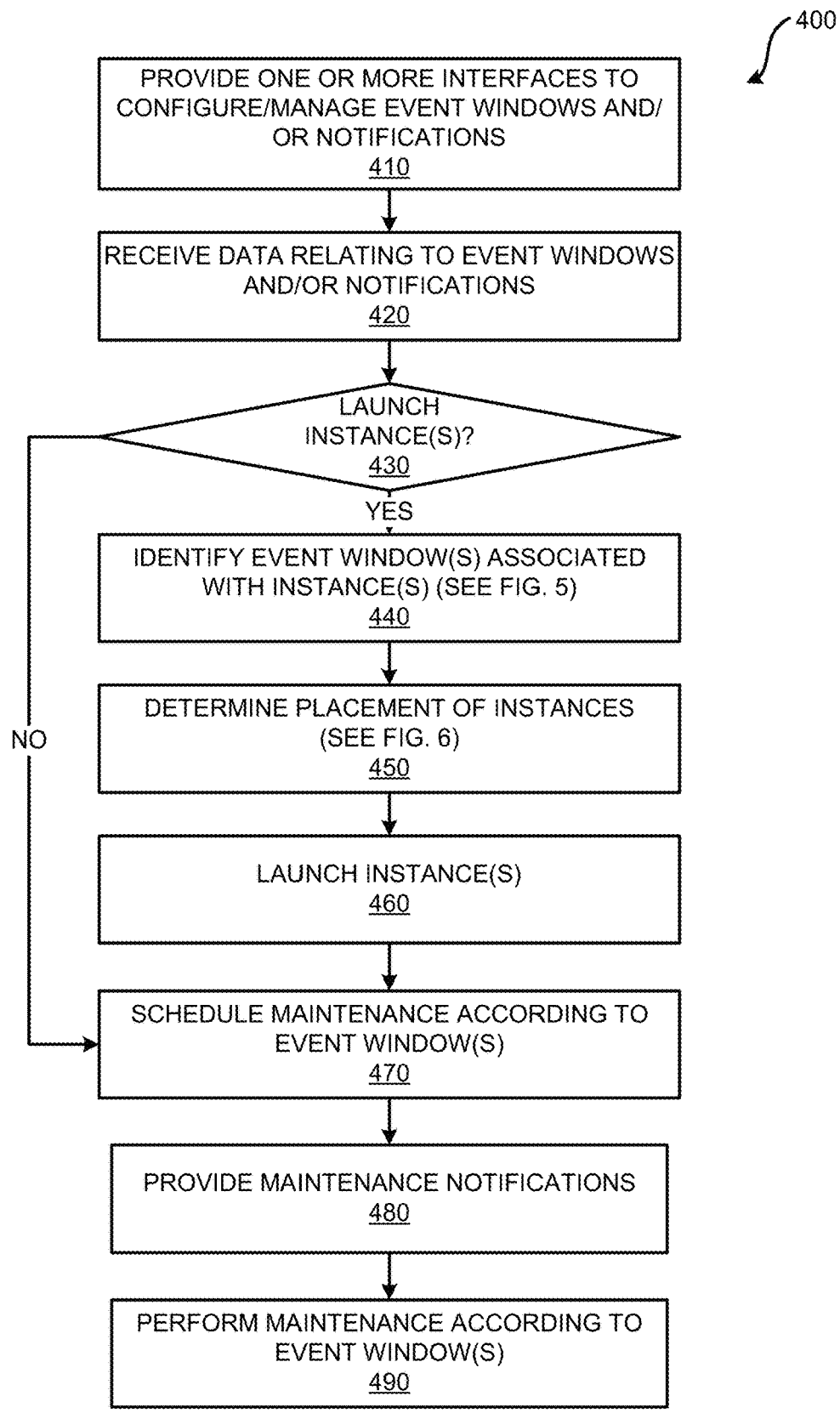
FIG. 4 is a flow diagram showing an illustrative routine for utilizing maintenance windows for placement of instances and scheduling maintenance, according to some examples.
Figure 5:
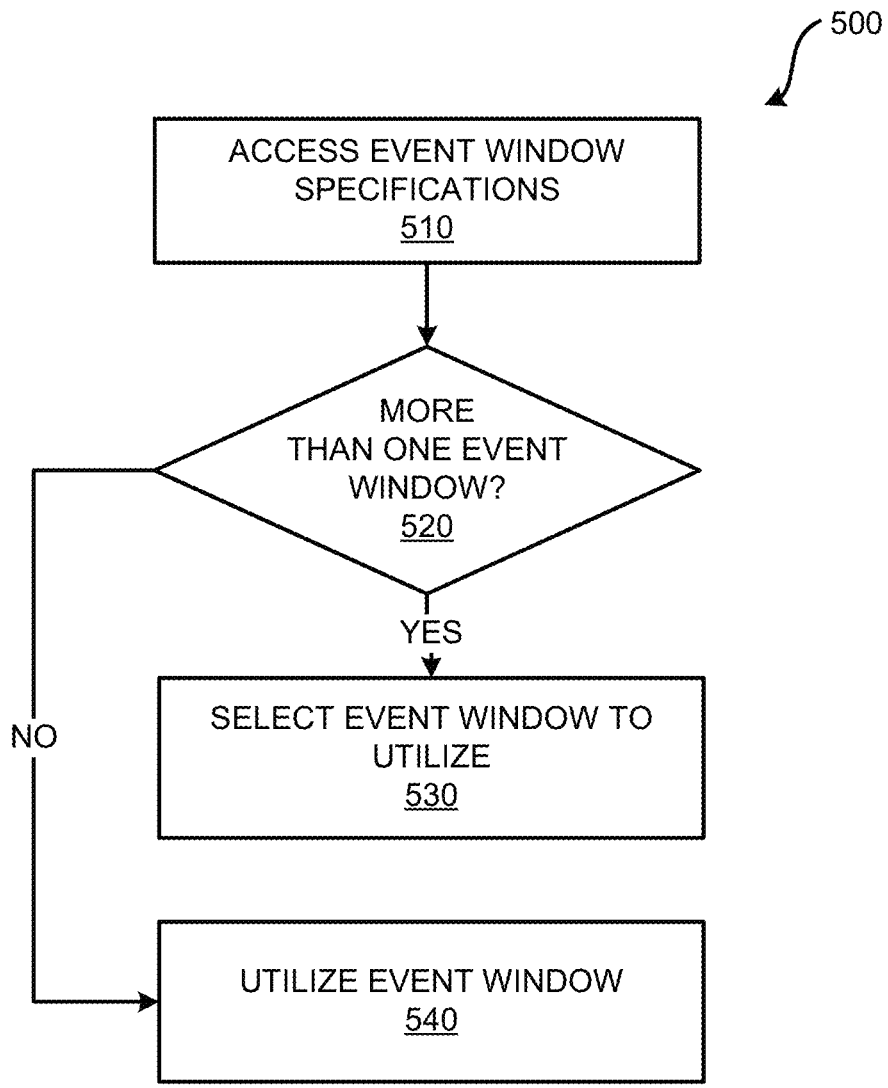
FIG. 5 is a flow diagram showing an illustrative routine for identifying an event window to utilize, according to some examples.
Figure 6:
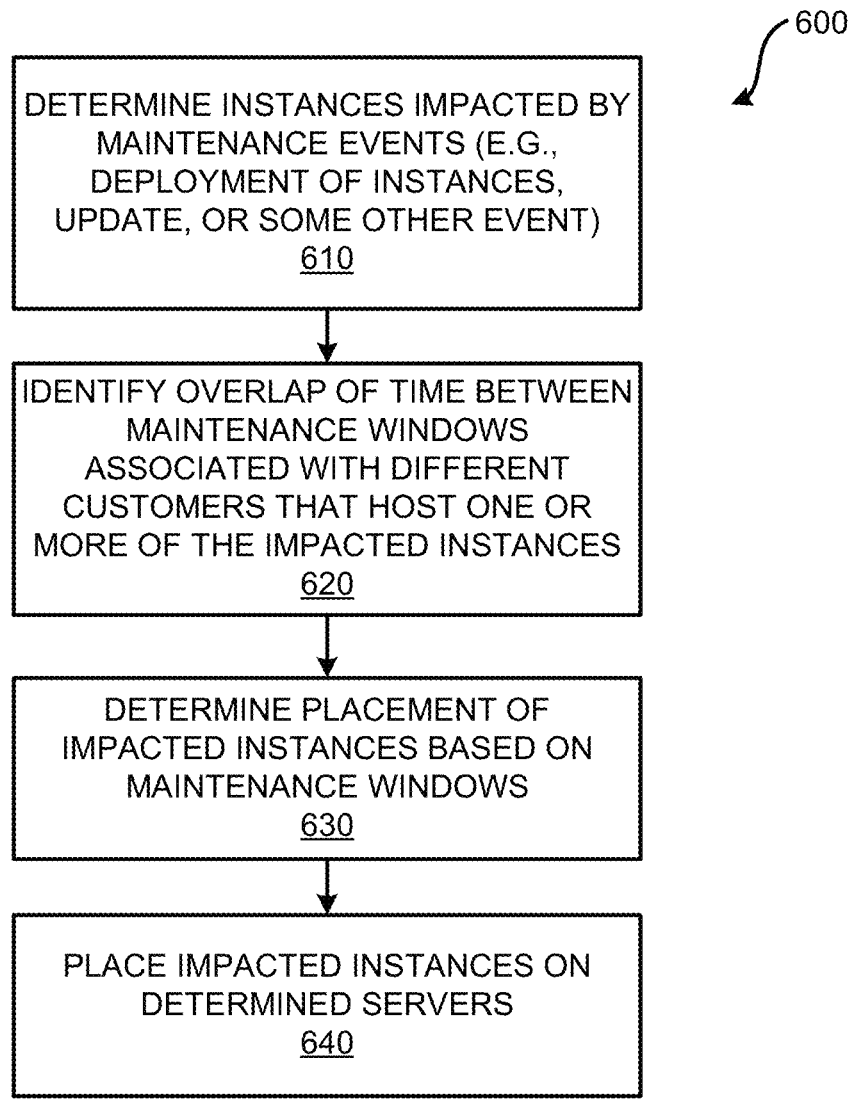
FIG. 6 is a flow diagram showing an illustrative routine for determining placement of instances, according to some examples.

FIGS. 4-6 are flow diagrams showing illustrative routines 400, 500, and 600 for configuration of event windows and notifications and the scheduling of maintenance events, according to examples disclosed herein. It should be appreciated that the logical operations described herein with respect to FIG. 4, FIG. 5, FIG. 6, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

FIG. 4 is a flow diagram showing an illustrative routine 400 for utilizing maintenance windows for placement of instances and scheduling maintenance, according to some examples. The routine 400 may be performed by computing resources 124 associated with the MS 102 and/or other computing resources, such as computing resources associated with some other network or system.

At 410, one or more interfaces are provided for configuration and management of maintenance windows and notifications. As discussed above, the MS 102 may expose one or more API(s) 112, a CLI, and/or a UI 138, such as a graphical user interface. A user 140 may utilize the interfaces to configure, view, and manage maintenance windows and notifications.

At 420, data is received that is related to configuration/management of maintenance event window(s) and/or notifications. For example, the request may be to create/edit an event window, modify notifications, or perform some other action or operation. As discussed above, the data may be received from a user, such as user 140 of a service provider network 104. In some examples, the maintenance service 110 within MS 102 receives the data and stores the data in the data store 116.

At 430, a decision is made as to whether instances are to be launched. As described above, a customer, or some other authorized user and/or component, may instruct that one or more instances be launched. When there is an instruction to launch instance(s), the routine moves to 440. When there is not an instruction to launch instance(s), the routine moves to 460.

At 440, the event window(s) associated with the instance(s) are identified. As discussed above, the MS 102 may identify the event window(s) associated with the instance(s) and select an event window to utilize. See FIG. 5 and related description for further details.

At 450, the placement of instance(s) is determined. As discussed above, the MS 102 may determine the placement of instances 106 on server(s)/host(s) 108 using event windows defined by one or more customers. Generally, the maintenance service 110 determines the placement of instances 106 on a server(s)/host(s) 108 such that other instances 106 that are also placed, or already placed, on the server(s)/host(s) 108 are associated with event windows that have the same specified times (or at least a portion of time that overlaps between the different maintenance windows). In this way, when a subsequent maintenance event is to occur, the maintenance may be performed at a time that was specified by the customer. See FIG. 6 and related description for further details.

At 460, the instance(s) are launched on the server(s) according to the event window(s). As discussed above, the maintenance service 110 and/or some other device or component may launch the instance(s).

At 470, maintenance that involves instances 106 is scheduled according to the defined event window(s). As discussed above, the maintenance service 110 may schedule maintenance for instances 106 associated with a customer such that the maintenance is performed during the time period specified by the event window(s) as specified by the customer.

At 480, maintenance notifications may be provided. As discussed above, the MS 102 may provide notifications for upcoming maintenance events. In some examples, the notifications include default information along with the additional information specified by the user 140. The notification(s) may be provided to the user 140 via a UI 138. In other examples, the notification(s) may be provided to a service, component and/or device.

At 490, the maintenance is performed according to the defined event window(s). As discussed above, the maintenance service 110 may schedule the maintenance that impacts the computing resources (e.g., the instances 106) according to the times associated with the defined maintenance event windows.

FIG. 5 is a flow diagram showing an illustrative routine 500 for identifying an event window to utilize, according to some examples. The routine 500 may be performed by computing resources 124 associated with the MS 102 and/or other computing resources associated with the network.

At 510, event window specifications are received. As discussed above, the user 140 may utilize an API 112, a CLI, or a UI 138 to create/configure one or more event window. In some configurations, the maintenance service 110 accesses the data that identifies the specifications associated with the event window.

At 520, a decision is made as to whether there is more than one event window associated with a computing resource. When there is more than one event window, the routine moves to 530. When there is not more than one event window, the routine moves to 540.

At 530, the event window to utilize is selected. As discussed above, when deciding which event window to utilize, the MS 102 may choose the event window based on various criteria. For instance, the MS 102 may follow the order that utilizes the most specific event window to the least specific event window. For a given instance is scheduled for maintenance, the MS 102 looks for an event window that is directly associated with that instance identifier, followed by an event window that is associated with tags that match the tags associated with the instance, followed by a window associated with a particular location/region, and the like. If the MS 102 is not able to identify an event window that is associated with a particular instance, then the MS 102 may schedule maintenance on any day and provide a notification to the user (e.g., 2 weeks in advance before the scheduled maintenance time).

At 540, when there is not more than one event window associated with the instances 106, then the event window is utilized. As discussed above, the MS 102, or maintenance service 110 may utilize the time window associated with the event window to determine what server(s)/host(s) 108 to place the instances 106 on and determine the time(s) that are identified to be acceptable by customer(s) to perform maintenance.

FIG. 6 is a flow diagram showing an illustrative routine for determining placement of instances, according to some examples. The routine 600 may be performed by computing resources 124 associated with the MS 102 and/or other computing resources associated with the network.

At 610, the instances impacted by maintenance events may be determined. As discussed above, instances may be impacted based on various criteria, such as but not limited to deployment of instances 106, a server(s)/host(s) 108 undergoing maintenance, an update to software, an update to an instance type, and the like. Generally, a maintenance event may cause an instance to be deployed (e.g., started/launched) within the service provider network, re-booted, re-started, replaced, cause network connectivity and/or power to be lost for a period of time, and the like.

At 620, the MS 102 may determine an overlap of time between maintenance event windows defined by the different customers that are associated with instances that are to undergo a maintenance event. As discussed above, the MS 102 may identify that a first event window associated with a first customer has an overlap of time with one or more event windows specified by other customers that are associated with instances that are to undergo a maintenance event. As an example, the MS 102 may determine that the overlap of time is a time that is included within two or more different windows (e.g., 10-11, 1-4, 10:30-2:30, . . . ).

At 630, the placement of the instances impacted by the maintenance events may be determined. As discussed above, the MS 102 may place instances determined in 620 on one or more of the same server(s)/host(s) 108. In this way, the MS 102 may minimize disruption not only to the customers that have specified the maintenance windows, but also to the server(s)/host(s) 108 hosting the instances.

At 640, the impacted instances may be placed on the determined servers. As discussed above, the MS 102 may place the instances on one or more server(s)/host(s) 108.

Figure 7:
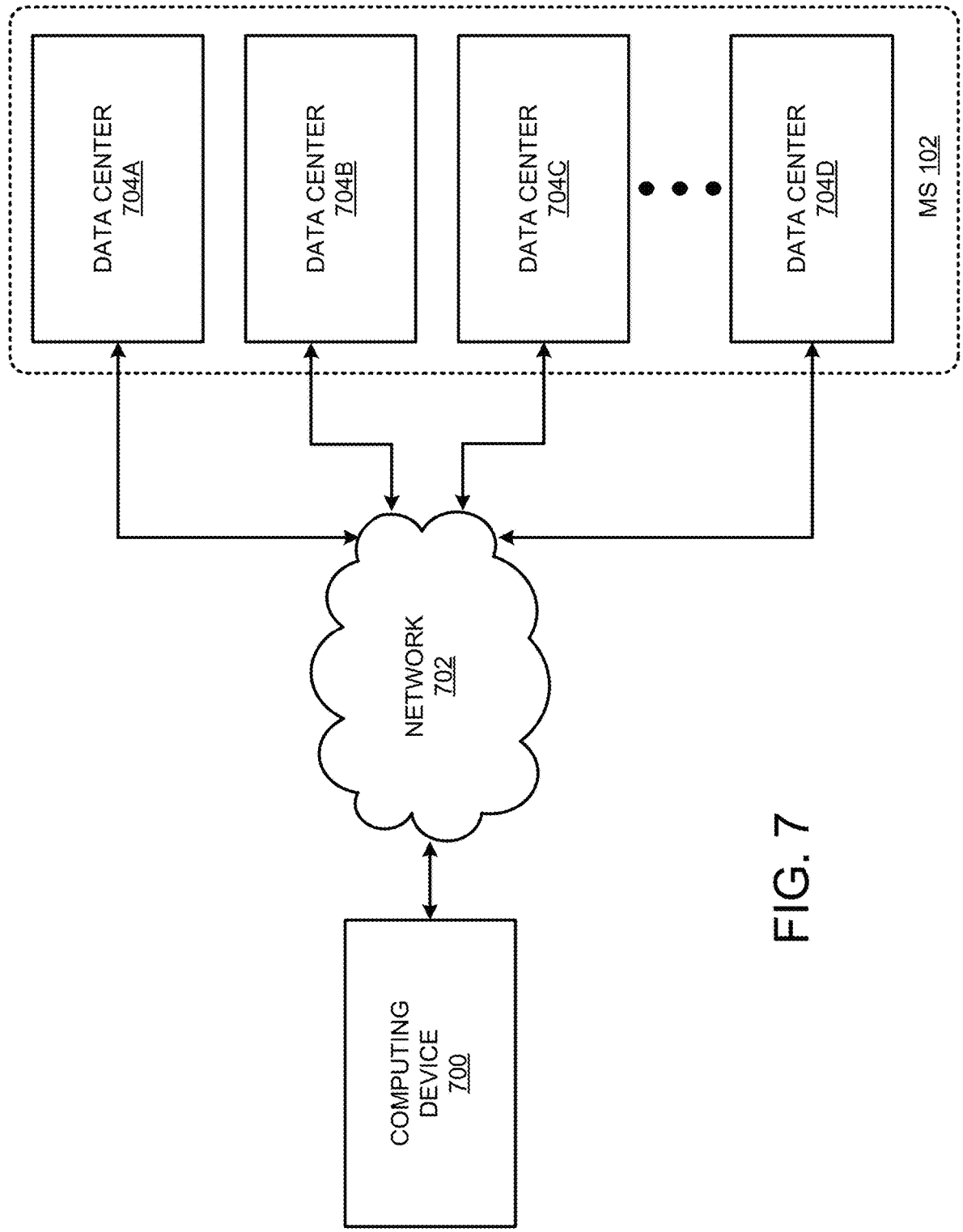
FIG. 7 is a system and network diagram that shows an illustrative operating environment including several data centers that can be configured to implement aspects of the functionality described herein.

FIG. 7 is a system and network diagram that shows one illustrative operating environment for the configurations disclosed herein that includes an MS 102 that can be configured to provide the functionality described above. As discussed above, the MS 102 can execute network services that provide computing resources for implementing the functionality disclosed herein. The computing resources implemented by the MS 102 can be data processing resources, such as virtual machine ("VM") instances, data storage resources, networking resources, data communication resources, network services, and other types of resources.

The computing resources utilized can be general-purpose or can be available in a number of specific configurations. For example, data processing resources can be available as physical computers or VM instances in a number of different configurations. The VM instances can be configured to execute applications, including web servers, servers, media servers, database servers, some or all of the network services described above, and/or other types of programs. Data storage resources can include file storage devices, block storage devices, and the like. The MS 102 can also include and utilize other types of computing resources not mentioned specifically herein.

As also discussed above, the computing resources provided by the MS 102 are enabled in one implementation by one or more data centers 704A-704D (which might be referred to herein singularly as "a data center 704" or collectively as "the data centers 704"). The data centers 704 are facilities utilized to house and operate computer systems and associated components. The data centers 704 typically include redundant and backup power, communications, cooling, and security systems. The data centers 704 can also be located in geographically disparate locations. One illustrative configuration for a data center 704 that can be utilized to implement the technologies disclosed herein will be described below with regard to FIG. 8.

The users can access the services provided by the MS 102 over a network 702, which can be a wide area communication network ("WAN"), such as the Internet, an intranet or an Internet service provider ("ISP") network or a combination of such networks. For example, and without limitation, a computing device 700 operated by a user 140 or other user of the MS 102, such as the computing device 128, can be utilized to access the MS 102 by way of the network 702. It should be appreciated that a local-area network ("LAN"), the Internet, or any other networking topology known in the art that connects the data centers 704 to remote users and other users can be utilized. It should also be appreciated that combinations of such networks can also be utilized.

Figure 8:
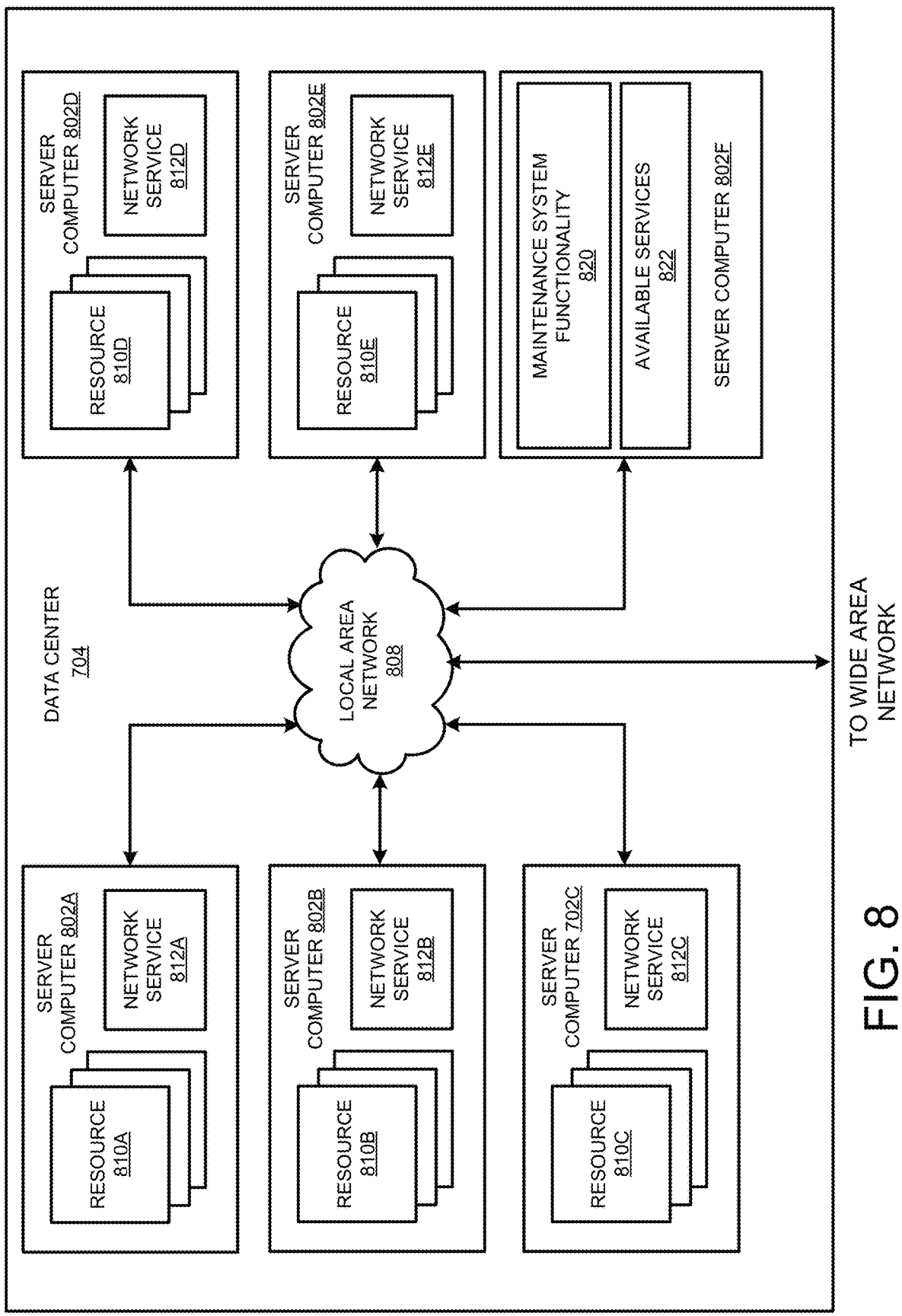
FIG. 8 is a computing system diagram illustrating a configuration for a data center that can be utilized to implement aspects of the technologies disclosed herein.

FIG. 8 is a computing system diagram that illustrates examples for a data center 704 that can be utilized for flexible maintenance event windows and notifications for maintenance impacting instances, and the other functionality disclosed herein. The example data center 704 shown in FIG. 8 includes several server computers 802A-802F (which might be referred to herein singularly as "a server computer 802" or in the plural as "the server computers 802").

The server computers 802 can be standard tower, rackmount, or blade server computers configured appropriately for providing various types of computing resources 810 for implementing the functionality disclosed herein. As mentioned above, the computing resources 810 provided by the data center 704 can be data processing resources such as VM instances or hardware computing systems, data storage resources, database resources, networking resources, and others. Some of the servers 802 can also be configured to execute network services 812A-812E, respectively, capable of instantiating, providing and/or managing the computing resources 810A-810E.

The data center 704 shown in FIG. 8 also includes a server computer 802F that can execute some or all of the software components described above. For example, and without limitation, the server computer 802F can be configured to execute functionality described herein, such as maintenance system functionality 820 and other available services 822. The server computer 802F can also be configured to execute other components and/or to store data for providing some or all of the functionality described herein. In this regard, it should be appreciated that components or different instances of the services can execute on many other physical or virtual servers in the data centers 704 in various configurations.

In the example data center 704 shown in FIG. 8, an appropriate LAN 808 is also utilized to interconnect the server computers 802A-802F. The LAN 808 is also connected to the network 702 illustrated in FIG. 7. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 704A-704D, between each of the server computers 802A-802F in each data center 704, and, potentially, between computing resources 810 in each of the data centers 704. It should be appreciated that the configuration of the data center 704 described with reference to FIG. 8 is merely illustrative and that other implementations can be utilized.

Figure 9:
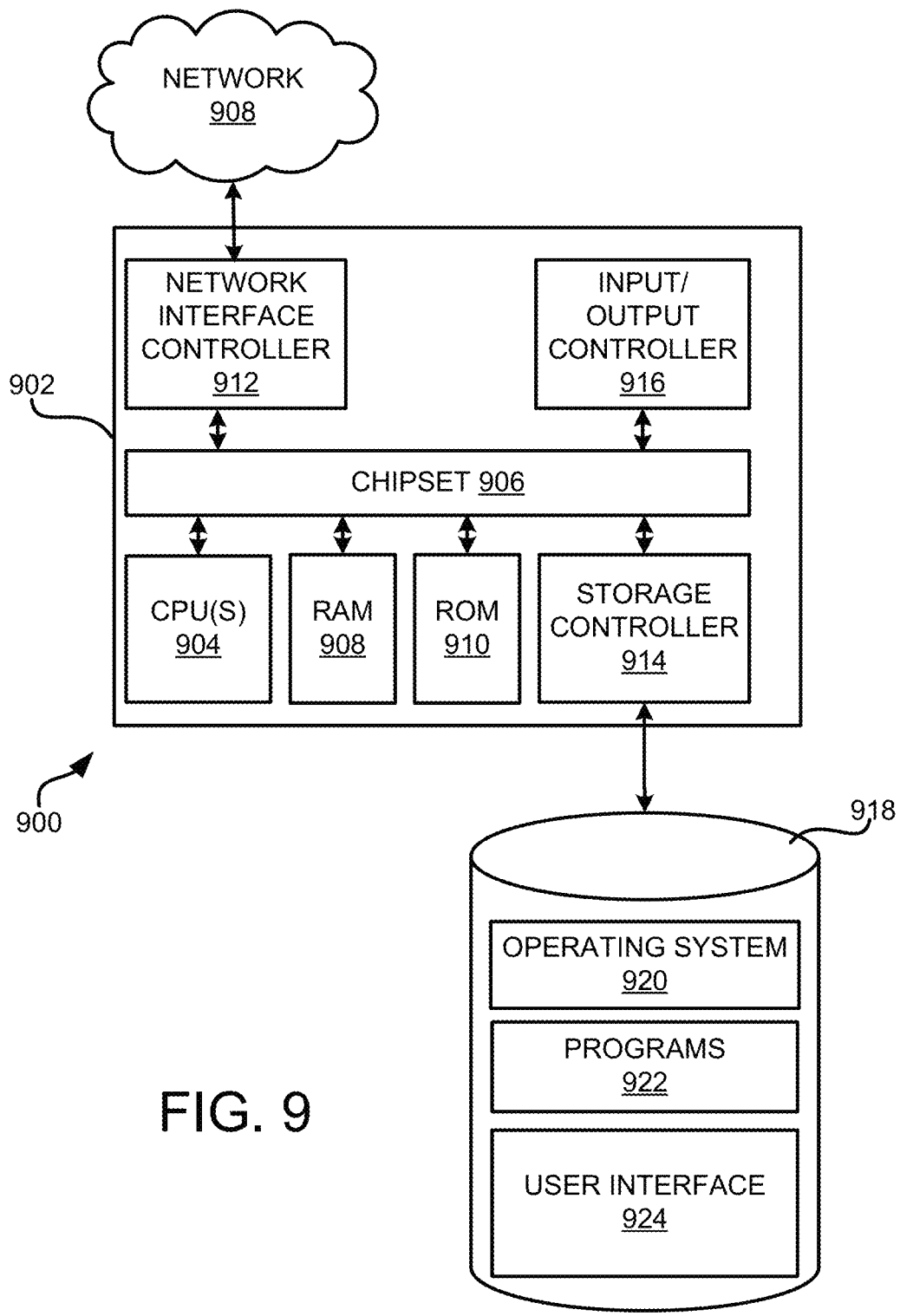
FIG. 9 is a computer architecture diagram showing an illustrative computer hardware architecture for implementing a computing device that can be utilized to implement aspects of the various technologies presented herein.

FIG. 9 shows an example computer architecture for a computer 900 capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic process that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 908. The chipset 906 can include functionality for providing network connectivity through a NIC 912, such as a gigabit Ethernet adapter. The NIC 912 is capable of connecting the computer 900 to other computing devices over the network 908. It should be appreciated that multiple NICs 912 can be present in the computer 900, connecting the computer to other types of networks and remote computer systems.

The computer 900 can be connected to a mass storage device 918 that provides non-volatile storage for the computer. The mass storage device 918 can store an operating system 920, programs 922, workload control user interface 924, and data, which have been described in greater detail herein. The mass storage device 918 can be connected to the computer 900 through a storage controller 914 connected to the chipset 906. The mass storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the mass storage device 918 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 918 is characterized as primary or secondary storage, and the like.

For example, the computer 900 can store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the mass storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 918 can store an operating system 920 utilized to control the operation of the computer 900. According to examples, the operating system comprises the LINUX operating system or one of its variants. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 918 can store other system or application programs and data utilized by the computer 900.

In examples, the mass storage device 918 or other computer-readable storage media is encoded with computer-executable instructions which, when loaded into the computer 900, transform the computer from a general-purpose computing system into a special-purpose computer capable of implementing the configurations described herein. These computer-executable instructions transform the computer 900 by specifying how the CPUs 904 transition between states, as described above. According to examples, the computer 900 has access to computer-readable storage media storing computer-executable instructions which, when executed by the computer 900, perform the various processes described above with regard to FIGS. 1-9. The computer 900 can also include computer-readable storage media for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or can utilize an architecture completely different than that shown in FIG. 9.

Based on the foregoing, it should be appreciated that technologies for configuration and management of flexible maintenance windows and notifications for maintenance impacting instances have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system comprising:
   one or more processors; and
   one or more computer-readable media storing computer-executable instructions that, when executed by the one or more processors, cause the one or more processors to:

receive, from a computing device of a user of a cloud provider network, event window configuration data for a first maintenance event window that identifies a window of time in which maintenance events associated is allowed to be performed by the service provider network for a Virtual Machine (VM) instance, wherein the event window configuration data includes a name of the first maintenance event window, a starting time at which the maintenance events begin, an ending time by which the maintenance events are to be completed, and an identification of the VM instance to which the first maintenance event window applies;

identify that there is an overlap of time between the first maintenance event window associated with the VM instance and a second maintenance event window associated with a different VM instance;

determine, based on the overlap of time, to co-locate the VM instance and the different VM instance on a server;

identify a time at which to perform a particular maintenance event on the server, wherein the particular maintenance event interrupts availability of the VM instance and the different VM instance, and wherein the time is within the overlap time; and cause performance of the particular maintenance event to begin at the time.

2. The system of claim 1, wherein the instructions further cause the one or more processors to:

provide for display, to the computing device of the user, a graphical user interface (GUI) that includes user interface (UI) elements relating to configuring the event window configuration data for the first maintenance event window and notification configuration data for a notification, wherein the UI elements include a first UI element that is configured to receive a selection of a tag to associate with the first maintenance event window, and a second UI element configured to receive the starting time;

associate the VM instance with the tag; and provide a notification that indicates to the user of the particular maintenance event.

3. The system of claim 1, wherein the instructions further cause the one or more processors to identify that there is overlap between the first maintenance event window associated with the VM instance and a third maintenance event window associated with other VM instances and determine to co-locate other VM instances on the server.

4. The system of claim 1, wherein identifying the time at which to perform the particular maintenance event is further based on past inputs received from the computing device of the user.

5. A computer-implemented method, comprising:

receiving, at a service provider network, first event window configuration data associated with a first maintenance event window that identifies a window of time in which maintenance events associated with a first Virtual Machine (VM) instance are allowed to be performed by the service provider network, wherein the first event window configuration data includes a starting time at which the maintenance events begin, an ending time by which the maintenance events are to be completed, and an identification of the first VM instance to which the first maintenance event window applies;

determining an overlap of time between the first maintenance event window and a second maintenance event window associated with a second VM instance;

based at least in part on determining the overlap of time, co-placing the first VM instance and the second VM instance on a server in the service provider network;

identifying a maintenance time to perform a particular maintenance event, wherein the maintenance time is within the overlap of time; and causing performance of the particular maintenance event to begin at the maintenance time, wherein the performance causes the first VM instance and the second VM instance to be inaccessible for at least a period of time.

6. The computer-implemented method of claim 5, wherein identifying the maintenance time is based at least in part on past inputs received from a computing device of a user associated with the first maintenance event window.

7. The computer-implemented method of claim 5, further comprising determining a placement of other VM instances based, at least in part, on the overlap of time.

8. The computer-implemented method of claim 5, further comprising receiving, from a computing device of a user of a service provider network, second event window configuration data associated with one or more notifications that indicate that the maintenance event associated with at least one of the first VM instance and the second VM instance is to be performed.

9. The computer-implemented method of claim 8, wherein the second event window configuration data identities tags to include within the one or more notifications, wherein the tags indicate information related to the one or more of the first VM instance and the second VM instance.

10. The computer-implemented method of claim 9, further comprising providing a notification, to the computing device associated with the user, indicating the maintenance time and the tags.

11. The computer-implemented method of claim 8, further comprising providing for display, to the computing device of a user, a graphical user interface (GUI) that includes user interface (UI) elements relating to the second event window configuration data for the one or more notifications, wherein the UI elements include a first UI element that is configured to receive a selection of tags to include with the one or more notifications.

12. The computer-implemented method of claim 5, further comprising providing for display, to a computing device of a user of a service provider network, a graphical user interface (GUI) that includes user interface (UI) elements relating to configuring the event window configuration data associated with the first maintenance event window.

13. A system comprising:

one or more processors associated with a service provider network; and one or more computer-readable media storing computer-executable instructions that, when executed by the one or more processors, cause the one or more processors to:

receive, at a service provider network, first event window configuration data associated with a first maintenance event window that identifies a first window of time in which maintenance events associated with one or more first Virtual Machine (VM) instances are allowed to be performed by the service provider network, wherein the first event window configuration data includes a starting time at which the maintenance events begin, an ending time by which the maintenance events are to be completed, and an identification of the one or more first VM instances to which the maintenance event window applies;

determine an overlap of time between the first maintenance event window and a second maintenance event window associated with one or more second VM instances;

based at least in part on determining the overlap of time, co-placing at least one of the one or more first VM instances and at least one of the one or more second VM instances on a server in the service provider network;

identify a maintenance time to perform a particular maintenance event, wherein the maintenance time is within the overlap of time; and cause performance of the particular maintenance event to begin at the maintenance time, wherein the performance causes the first VM instance and the second VM instance to be inaccessible for at least a period of time.

14. The system of claim 13, wherein the instructions further cause the one or more processors to:

receive, at the service provider network, second event window configuration data associated with the second maintenance event window that identifies the second window of time; and cause performance of the maintenance event for the one or more first VM instances and the one or more second VM instances.

15. The system of claim 13, wherein identifying the maintenance time is based at least in part on past inputs received from a computing device of a user.

16. The system of claim 13, wherein the instructions further cause the one or more processors to receive, from a computing device of a user of the service provider network, third event window configuration data associated with one or more notifications that indicates the maintenance event is to occur.

17. The system of claim 16, wherein the third event window configuration data identifies tags to include with the one or more notifications.

18. The system of claim 17, wherein the instructions further cause the one or more processors to provide the one or more notifications, to the computing device, indicating the maintenance time and the tags.

19. The system of claim 16, wherein the instructions further cause the one or more processors to provide for display, to the computing device of the user, a graphical user interface (GUI) that includes user interface (UI) elements relating to the third event window configuration data for the one or more notifications, wherein the UI elements include a first UI element that is configured to receive a selection of tags.

20. The system of claim 13, wherein the instructions further cause the one or more processors to provide for display, to a computing device of a user, a graphical user interface (GUI) that includes user interface (UI) elements relating to configuring the first event window configuration data associated with the first maintenance event window.

* * * * *